(12) United States Patent
Hauck et al.

(10) Patent No.: US 12,473,148 B2
(45) Date of Patent: Nov. 18, 2025

(54) ELECTRIC VEHICLE AND METHOD FOR OPERATING AN ELECTRIC VEHICLE

(71) Applicant: SEW-EURODRIVE GMBH & CO. KG, Bruchsal (DE)

(72) Inventors: Matthias Hauck, Schwetzingen (DE); Christian Lampert, Karlsdorf-Neuthard (DE); Michal Fiala, Aalen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 381 days.

(21) Appl. No.: 17/922,658

(22) PCT Filed: Apr. 14, 2021

(86) PCT No.: PCT/EP2021/059703
§ 371 (c)(1),
(2) Date: Nov. 1, 2022

(87) PCT Pub. No.: WO2021/223968
PCT Pub. Date: Nov. 11, 2021

(65) Prior Publication Data
US 2023/0264894 A1 Aug. 24, 2023

(30) Foreign Application Priority Data

May 5, 2020 (DE) .......................... 102020002674.5

(51) Int. Cl.
*B60L 58/20* (2019.01)
*B60L 50/40* (2019.01)
(Continued)

(52) U.S. Cl.
CPC ............ *B65G 1/0492* (2013.01); *B60L 50/40* (2019.02); *B60L 50/60* (2019.02); *B60L 2200/40* (2013.01);
(Continued)

(58) Field of Classification Search
CPC ...... B60L 50/40; B60L 50/60; B60L 2200/40; B60L 2210/10; B60L 2240/545;
(Continued)

(56) References Cited

U.S. PATENT DOCUMENTS 6,265,851 B1 7/2001 Brien et al.
8,400,106 B2 3/2013 Midrouillet et al.
(Continued)

FOREIGN PATENT DOCUMENTS

CN 102611203 A 7/2012
DE 19545544 A1 12/1996
(Continued)

OTHER PUBLICATIONS

International Report on Patentability issued in corresponding International Application No. PCT/EP2021/059703 dated Nov. 8, 2022, pp. 1-9, English Translation.
(Continued)

*Primary Examiner* — Rexford N Barnie
*Assistant Examiner* — Swarna N Chowdhuri
(74) *Attorney, Agent, or Firm* — Carter, DeLuca & Farrell LLP

(57) ABSTRACT

An electric vehicle includes an electric drive device, first and second energy storage devices, and a bidirectional DC converter. The drive device, the DC converter, and the second energy storage device are connected to each other via a common intermediate circuit. The intermediate circuit includes an intermediate circuit voltage, the first energy storage device includes a storage voltage and is connected to the intermediate circuit via the DC converter. The drive device is supplied with drive energy by the first and/or second energy storage device. The intermediate circuit voltage is converted into the storage voltage in a first converter direction by the DC converter. The storage voltage is con-
(Continued)

verted into the intermediate circuit voltage in a second converter direction by the DC converter. The first converter direction is activated when charging the second energy storage device and is deactivated when discharging the second energy storage device.

21 Claims, 1 Drawing Sheet

(51) Int. Cl.
  *B60L 50/60* (2019.01)
  *B65G 1/04* (2006.01)
(52) U.S. Cl.
  CPC ..... *B60L 2210/10* (2013.01); *B60L 2240/545* (2013.01); *B60L 2240/547* (2013.01)
(58) Field of Classification Search
  CPC ............... B60L 2240/547; Y02T 10/70; Y02T 10/7072; Y02T 10/72; Y02T 90/14
  USPC ........................................................ 307/10.1
  See application file for complete search history.

(56) References Cited

U.S. PATENT DOCUMENTS

| | | | |
|---|---|---|---|
| 9,037,335 | B2 | 5/2015 | Bär |
| 2012/0037440 | A1* | 2/2012 | Bar ........................ B60L 50/40 180/167 |
| 2013/0249469 | A1* | 9/2013 | Pahlevaninezhad ...... H02J 7/02 320/137 |
| 2015/0115707 | A1 | 4/2015 | Reichow et al. |
| 2015/0137751 | A1* | 5/2015 | King ....................... B60L 50/51 320/109 |
| 2015/0283911 | A1* | 10/2015 | Ambrosio ............... B60L 50/40 307/10.1 |
| 2015/0352961 | A1 | 12/2015 | Kim et al. |
| 2016/0297307 | A1 | 10/2016 | Hinterberger et al. |
| 2019/0389328 | A1 | 12/2019 | Blickle |
| 2023/0021793 | A1* | 1/2023 | Alam ...................... B60L 58/12 |

FOREIGN PATENT DOCUMENTS

| | | |
|---|---|---|
| DE | 102006047654 A1 | 4/2008 |
| DE | 102009014386 A1 | 9/2010 |
| DE | 102015004701 A1 | 10/2016 |
| DE | 102017005153 A1 | 12/2017 |
| DE | 102017010924 A1 | 6/2018 |
| DE | 202018003439 U1 | 9/2018 |
| DE | 102020007349 A1 | 6/2021 |
| EP | 2419364 B1 | 6/2013 |
| EP | 2918441 A1 | 9/2015 |

OTHER PUBLICATIONS

International Search Report issued in corresponding International Application No. PCT/EP2021/059703 dated Aug. 2, 2021, pp. 1-2, English Translation.

* cited by examiner

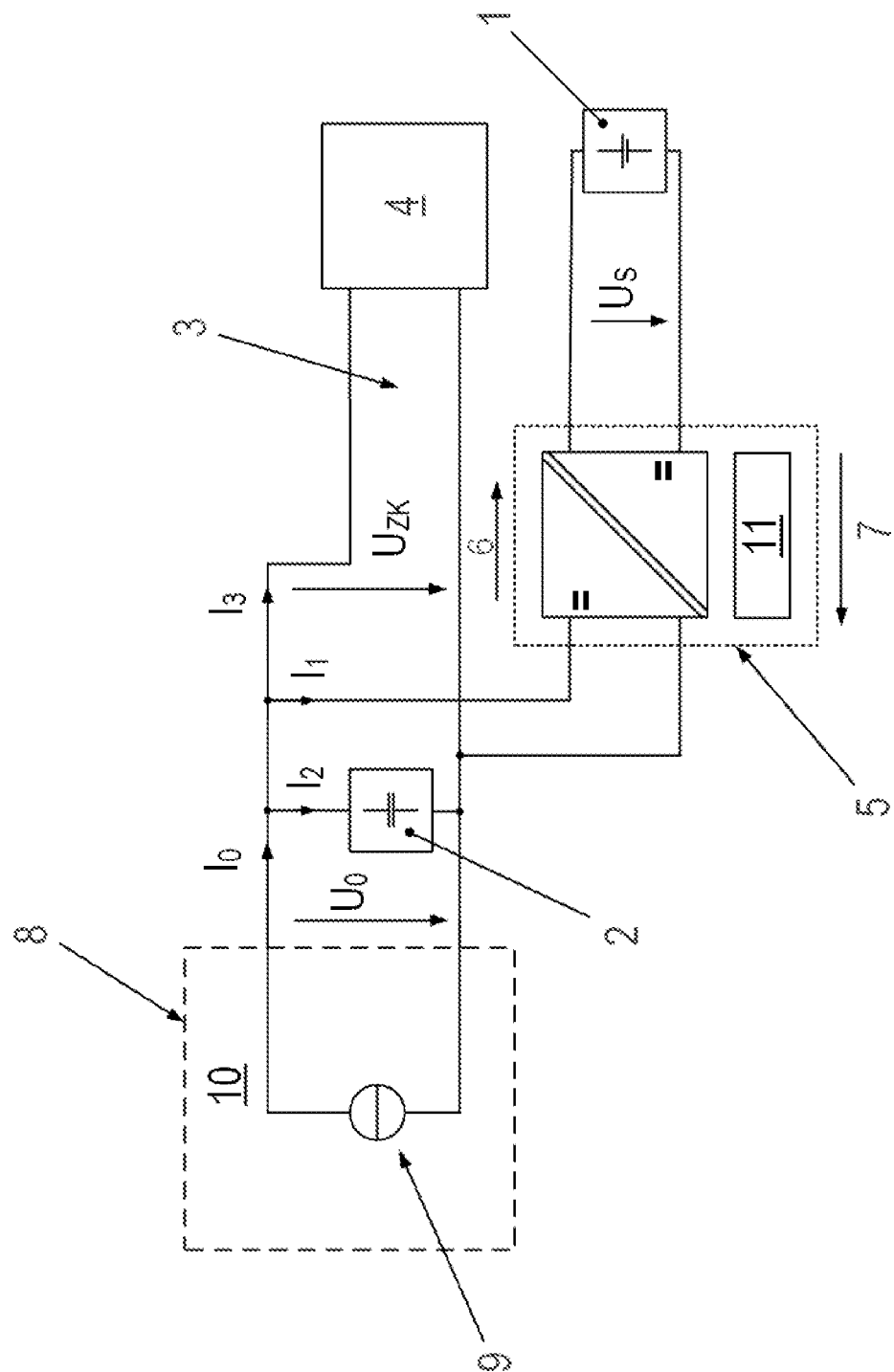

ELECTRIC VEHICLE AND METHOD FOR OPERATING AN ELECTRIC VEHICLE

FIELD OF THE INVENTION

The present invention relates to an electric vehicle and a method for operating an electric vehicle.

An electric vehicle is provided, for example, as an automated guided mobile assistance system. Alternatively, such a vehicle can also be referred to as an automated guided transport vehicle (AGV).

BACKGROUND INFORMATION

An automated guided vehicle for transporting loads is described in German Patent Document No. 10 2007 002 242. Such load transporting can be referred to as an internal logistics application. The automated guided vehicle is supplied inductively with energy.

An industrial train system is described in German Patent Document No. 195 45 544, in which the vehicles are supplied with electrical energy by contact lines. In order to be able to operate the vehicle even when the external power supply is not available, it is provided that electrolyte or Goldcap capacitors, also known as ultracapacitors, supercapacitors, or double-layer capacitors, are used as the electrical energy source.

An ultracapacitor power supply for an electric vehicle is described in U.S. Pat. No. 6,265,851. The electric vehicle has two energy storage devices able to be used selectively for driving the vehicle.

An automated guided transport system including two energy storage devices—one double-layer capacitor device and one battery device is described in European Patent Document No. 2 419 364. In normal operation, the double-layer capacitor device supplies energy to the drive device, that is, the motor. In case of emergency, that is, when the voltage in the double-layer capacitor device falls below a particular level, operation switches to the battery. The drive device is then supplied with energy exclusively by the battery device until the double-layer capacitor device is recharged at a charging station.

A method for operating an electric vehicle and an electric vehicle are described in German Patent Document No. 10 2017 005 153, in which the vehicle has a hybrid storage device and a double layer capacitor device. Both storage devices can selectively supply the travel drive device with energy.

SUMMARY

Example embodiments of the present invention provide for refining and simplifying the energy management of an electric vehicle, e.g., an automated guided, mobile assistance system having two different types of energy stores. Both energy stores are able to be used for supplying the drive motors.

According to an example embodiment of the present invention, an electric vehicle, e.g., an automated guided, mobile assistance system for an internal logistics application, includes an electric travel drive device for the driving motion, e.g., traction, of the vehicle, a first energy storage device is arranged, for example, as a rechargeable battery storage device, a second energy storage device, e.g., a double layer capacitor device, which is, for example, more rapidly chargeable and dischargeable than the first energy storage device and a bidirectional, e.g., galvanically isolated, DC converter, the electric drive device, the DC converter, and the second energy storage device being connected to each other via a common intermediate circuit, the intermediate circuit having an intermediate circuit voltage, the first energy storage device having a storage voltage and being connected to the intermediate circuit by the DC converter, the drive device being able to be supplied with drive energy by the first energy storage device and/or by the second energy storage device via the intermediate circuit, the intermediate circuit voltage being convertible to the storage voltage in a first converter direction by the DC converter for charging the first energy storage device, the storage voltage being convertible to the intermediate circuit voltage in a second converter direction by the DC converter for discharging the first energy storage device, the first converter direction being activated when charging the second energy storage device, and the first converter direction being deactivated when discharging the second energy storage device.

Thus, the travel drive device can be supplied with drive energy by two energy storage devices, and, e.g., power peaks can be rapidly buffered by the second energy storage device. The second energy storage device is, for example, configured so that the device is suitable as a primary energy source, e.g., the device mainly supplies the drive device with energy. The first energy storage device serves as a secondary energy source, for example, in order to provide reserve energy or to maintain the voltage level in the intermediate circuit at a particular minimum value. The first energy storage device is also suitable for receiving excess energy in the intermediate circuit, for example, present due to return feed from the drive device operating as a generator, for example, in case the capacity of the second energy storage device is not sufficient.

Because converting the voltage from the intermediate circuit to the first energy storage device and vice versa involves losses, the energy stored in the second energy storage device should be available exclusively for the drive device. This means that transferring charge from the second energy storage device to the first energy storage device should be avoided. In other words, the first energy storage device should receive only such energy that does not originate from the second energy storage device. This is the case, for example, when the travel drive device feeds energy back into the intermediate circuit as a generator. Charging and discharging the second energy storage device can be determined by measuring the current, in which the direction of current flow is determined. The terms "activated" and "deactivated" are understood to mean that when the converter direction is activated, voltage converting and thus energy transfer is principally possible in the direction. Whether the transfer also takes place is not determined thereby. "Activated converting direction" therefore does not necessarily mean that energy transfer actually takes place in the direction at any point in time. When the converting direction is deactivated, in principle no voltage converting and therefore no energy transfer is possible in the direction, even if it would be advantageous or desirable for any reason.

The second energy storage device is, for example, arranged as a double layer capacitor device and/or the second energy storage device is, for example, able to be charged and discharged more rapidly than the first energy storage device. A double layer capacitor device can be charged and completely discharged to a voltage of zero in a few seconds. The cycle stability thereof is in the range of 1 million, thus the device has a very large quantity of charging/discharging cycles. The device is therefore, for example, suitable for supplying peak power to electric consumers of the electric vehicle.

The first energy storage device is, for example, implemented as battery storage device. The battery storage device charges and discharges more slowly than a double layer capacitor device, presenting an advantageous configuration for the second energy storage device. The first energy storage device, for example, includes a higher energy density and has a lower power density and lower quantity of potential charging/discharging cycles in comparison with the second energy storage device. An example of a battery storage device is an arrangement of one or more secondary electrochemical elements, e.g., based on nickel and/or iron. Such a secondary electrochemical element includes a negative electrode, a positive electrode, a porous separator separating the negative and the positive electrodes from each other, and an, e.g., aqueous, alkaline electrolyte with which the electrodes and the separator are impregnated. Such a secondary electrochemical element based on nickel and/or iron is able, like a capacitor, to supply high impulse currents very rapidly, but otherwise demonstrates behavior more like a battery; for example, the capacitor equations $Q=C\,U$ and $W=\frac{1}{2}\,C\,U^2$ do not apply for the battery storage device. Such a battery storage device has a high cycle stability. The cycle stability is in the range between 1000 and 20000. Charging and discharging cycles can thus be performed more frequently before the performance criteria of the battery storage device can no longer be fulfilled. In addition, the battery storage device has an overload stability and a deep discharge stability. The device is capable of fast charging up to 15 C. Another example for a battery storage device is a Li-ion rechargeable battery.

According to example embodiments, the vehicle includes a power supply unit connected to the intermediate circuit for supplying energy to the intermediate circuit, e.g., in which energy can be fed into the power supply unit, e.g., for time segments, in a non-contacting manner or by contact.

For example, the vehicle can be externally supplied with energy. The power supply unit can be implemented as a charging device, for example, to which a plug can be connected for making contact when the vehicle is stationary. Power supply by contact can also be implemented during vehicle travel, for example, by contact lines. Alternatively, inductive energy transfer between primary conductors laid down in the floor and a secondary coil in the vehicle and connected to a rectifier connected to the intermediate circuit is also possible. The secondary coil, for example forms an oscillating circuit with a capacitor for resonantly transferring energy at an adjustable frequency of an alternating current flowing through the primary conductor. As described in German Patent Document No. 10 2017 005 153, which is expressly incorporated herein in its entirety by reference thereto, non-contacting power supply of the vehicle can be implemented. The energy can thus be supplied not only when the vehicle is stationary at charging stations, in which the primary conductor is arranged as a coil, but also during vehicle travel, in which the primary conductor is arranged as a linear conductor. For an existing, external power supply, it is, for example, possible to charge the first power supply device.

For example, transferring charge from the first energy storage device to the second energy storage device is possible and desired. This is considered advantageous primarily when the double-layer capacitor is drained, or the voltage thereof falls below a particular voltage level, in case of an unforeseen disruption or emergency. In this case, it is possible that the first energy storage device also provides energy for driving the vehicle. A further possible case for transferring energy from the first into the second energy store is switching on the vehicle after a longer period without use, without the charging device having to provide energy. Even if all consumers are shut down when the vehicle is stationary, for example, the energy content of the two energy storage devices drops due to self-discharge. The self-discharge is many times greater for a double layer capacitor device in the example embodiment for the second energy storage device than for a battery storage device as an example embodiment for the first energy storage device. The second energy storage device can therefore be drained after just a few hours or a few days of idle time, despite the consumers being switched off. By transferring energy from the first into the second energy storage device, the vehicle can be placed in a state ready for travel, even after a longer idle period, without the charging device having to provide energy. In other words, the vehicle does not need to be placed or parked in a place at which an external power supply is present.

The energy storage devices are primarily adapted for supplying energy to the vehicle during operating phases in which the vehicle does not have any external power supply available, as described above. Such phases could be travel between stationary charging stations or travel away from the primary conductor or contact lines. Normally, the second energy storage device supplies the drives of the vehicle. The consumption thereof depends approximately on the distance traveled without external power supply, and can be planned well beforehand, as the spatial arrangement of the charging infrastructure is known.

According to example embodiments, the power supply unit includes a regulated current source and a current regulator, in which an output current can be regulated to a specified value, e.g., in which the intermediate circuit voltage can be fed to the power supply unit as an input parameter, and, e.g., in which the power supply unit is deactivated when the intermediate circuit voltage is greater than a maximum intermediate circuit voltage value.

It is considered advantageous that the situation can be readily implemented for an inductively coupled power supply unit. The current regulator does not necessarily need the value of the intermediate circuit voltage. It is sufficient if the power supply unit includes a disconnect switch for interrupting the energy transfer into the intermediate circuit as soon as the intermediate circuit voltage exceeds the maximum intermediate circuit voltage value. The current is, for example, regulated independently of the overvoltage monitoring thus implemented.

According to example embodiments, the power supply unit includes a regulated voltage source and a first voltage regulator, in which an output DC voltage can be regulated to a specified value for the output DC voltage, e.g., in which the specified value is less than or equal to a maximum intermediate circuit voltage value.

It is considered advantageous that the intermediate circuit voltage can be maintained specifically at a voltage level preventing overloading of the consumers connected to the intermediate circuit.

According to example embodiments, the DC voltage converter includes a second voltage regulator, in which a specified value for the intermediate circuit voltage can be specified for the second voltage regulator, e.g., in which the specified value is equal to a limit value for the intermediate circuit voltage.

It is considered advantageous that the intermediate circuit voltage can be maintained specifically at a voltage level able to be adapted individually to the internal logistics application.

According to example embodiments, the vehicle includes a controller for controlling the travel motion of the vehicle, in which the controller is connected to the first energy storage device and can be supplied with energy by the same.

It is considered advantageous that the controller, potentially part of a vehicle electrical system, can be supplied with a constant voltage by the first energy storage device. Exemplary voltages include 12V, 24V, 48V, and 96V.

If the DC converter is galvanically isolated, then safe and simple separation between the vehicle electronics and the drive device is provided.

According to example embodiments, the second energy storage device is directly connected to the intermediate circuit, a time gradient of the intermediate circuit voltage can be measured by a voltage measuring device, e.g., continuously or at discrete time intervals, the first converter direction is activated when the gradient is positive or zero, and the first converter device is deactivated when the gradient is negative.

It is considered advantageous that it can be determined in a simple manner whether the second energy storage device is being charged or discharged. Furthermore, a current measuring device can be eliminated, by which the charging or discharging status would normally be determined. Because the second energy storage device has a capacitor characteristic, the energy $E_2$ in the second energy storage device is: $E_2 = \frac{1}{2} C_2 U_2^2$, in which $C_2$ represents the capacitance and $U_2$ represents the voltage of the second energy storage device. The charging current $I_2$, that is, the current leading to an increase in $E_2$ and thus to discharging the second energy storage device, is: $I_2 = C_2 * dU_2/dt$. When the second energy storage device is directly connected to the intermediate circuit, then $U_2 = U_{ZK}$, in which the intermediate circuit voltage is $U_{ZK}$. The charging current $I_2$ is therefore proportional to the voltage time gradient $dU_{ZK}/dt$ of the intermediate circuit voltage. A positive gradient therefore implies that the second energy storage device is being charged, while a negative gradient indicates discharging of the second energy storage device. When the gradient is equal to zero, neither charging nor discharging is taking place.

According to example embodiments, the DC converter is configured such that the second converter direction is activated for supporting the intermediate circuit voltage when the intermediate circuit voltage is less than an intermediate circuit voltage limit value and when the storage voltage is greater than a minimum storage voltage.

It is considered advantageous that the intermediate circuit voltage can always be maintained at a definable minimum voltage having the value of the intermediate circuit voltage limit value, as long as sufficient energy is present in the first energy storage device, that is, the voltage in the first energy storage device is above a definable minimum storage voltage.

According to example embodiments, the DC converter is configured such that the second converter direction is deactivated when the intermediate circuit voltage is greater than the intermediate circuit voltage limit value and/or when the storage voltage is less than a minimum storage voltage.

It is considered advantageous that the intermediate circuit voltage is not unnecessarily increased by the DC voltage converter when the voltage has already exceeded the intermediate circuit voltage limit value. Safety is thereby increased and overloading of the second energy storage device is avoided. In addition, energy is not unnecessarily transferred out of the first energy storage device into the intermediate circuit. Discharging of the first energy storage device below a minimum storage voltage is also thereby prevented.

According to example embodiments, the DC converter is configured such that the first converter direction is activated for charging the first energy storage device when the intermediate circuit voltage greater than the intermediate circuit voltage limit value and when the storage voltage is less than a maximum storage voltage.

It is considered advantageous that excess energy can be received in the intermediate circuit when the intermediate circuit voltage is above the intermediate circuit voltage limit value. Charging the first energy storage device, however, takes place only when there is a positive voltage gradient in the intermediate circuit.

According to example embodiments, the DC converter is configured such that the first converter direction is deactivated when the storage voltage is greater than a maximum storage voltage and/or the intermediate circuit voltage is less than the intermediate circuit voltage limit value.

It is considered advantageous that an overloading of the first energy storage device is avoided when the voltage is above the maximum storage voltage. In addition, charging of the first energy storage device is prevented when the voltage in the intermediate circuit is below the intermediate circuit voltage limit.

According to example embodiments, the second energy storage device is configured such that more current can be received than can be provided by the energy supply device.

It is considered advantageous that the power supply unit can be readily protected against overloading. To this end, only a voltage limiting device is necessary, the device deactivating the power supply unit when the maximum permissible operating voltage of the second energy storage device is reached.

According to example embodiments, the first energy storage device is separably disposed on the electrical vehicle, such that the first energy storage device can be changed out.

It is considered advantageous that the first energy storage device can be readily changed out in case of wear. The first energy storage device is thus not permanently mounted or integrated in the vehicle, but rather is releasably attached to the vehicle. Particularly when using safety extra-low voltage for the first energy storage device, the advantage arises that the first energy storage device can be readily changed out, even by a person who has not been correspondingly trained.

This is considered advantageous particularly when the first energy storage device is not configured for the service life of the vehicle and therefore is a wear part.

According to example embodiments, an overvoltage protection and/or undervoltage protection and/or overcurrent protection is provided at the first energy storage device by a current measurement and/or voltage measurement, and/or an overtemperature protection is provided at the first energy storage device by a temperature measurement, and/or an overvoltage protection and/or overcurrent protection is provided at the second energy storage device by a current measurement and/or voltage measurement, and/or an overtemperature protection is provided at the second energy storage device by a temperature measurement.

It is considered advantageous that safety is increased and damage to the energy storage devices is prevented.

According to an example embodiment of the present invention, in a method for operating an electric vehicle, e.g., an automated guided, mobile assistance system for an internal logistics application, the vehicle including an electric travel drive device for travel motion, e.g., traction, of the vehicle, a first energy storage device, e.g., arranged as a rechargeable battery storage device, a second energy storage device, e.g., a double layer capacitor device, e.g., being more rapidly chargeable and dischargeable than the first energy storage device, and a bidirectional, e.g., galvanically isolated, DC converter, the electric drive device, the DC converter, and the second energy storage device being connected to each other via a common intermediate circuit, the intermediate circuit having an intermediate circuit voltage, the first energy storage device having a storage voltage and being connected to the intermediate circuit by the DC converter, the drive device being supplied with drive energy by the first energy storage device and/or by the second energy storage device via the intermediate circuit, the intermediate circuit voltage being converted to the storage voltage in a first converter direction by the DC converter for charging the first energy storage device, the storage voltage being converted to the intermediate circuit voltage in a second converter direction by the DC converter for discharging the first energy storage device, the first converter direction being activated when charging the second energy storage device, and the first converter direction being deactivated when discharging the second energy storage device.

The same advantages arise thereby as were previously indicated for the electric vehicle.

Further features and aspects of example embodiments of the present invention are explained in greater detail below with reference to the appended schematic FIGURE.

BRIEF DESCRIPTION OF THE DRAWING

A vehicle according to an example embodiment of the present invention is schematically illustrated in FIG. 1.

DETAILED DESCRIPTION

FIG. 1 schematically illustrates the components of a vehicle according to an example embodiment of the present invention responsible for energy management. The vehicle, e.g., implemented as a mobile assistance system for an internal logistics application, has two energy storage devices 1, 2. In the present example embodiment, a battery storage 1, for example, a secondary electrochemical element, and a double-layer capacitor 2 are used. Modularly structured energy storage devices are also possible, each being made of a plurality of identical or different energy stores. It is substantial only that the second energy store 2 can be charged and discharged more rapidly than the first energy store 1.

The two energy stores 1, 2 are configured for supplying the travel drive 4 of the vehicle with the necessary drive energy.

To this end, the two energy stores 1, 2 are connected to the travel drive 4 via an intermediate circuit 3. While the double-layer capacitor is connected directly to the intermediate circuit 3, the battery store 1 is connected to the intermediate circuit 3 via, e.g., a galvanically isolated, DC converter 5. The travel drive 4 is implemented, for example, as a 3-phase alternating current motor having a 3-phase inverter connected upstream thereof. The inverter converts the intermediate circuit voltage $U_{ZK}$ present in the intermediate circuit into a 3-phase alternating voltage, e.g., in a conventional manner, by which the alternating current motor, for example, a cage rotor, is operated. The travel drive 4 can also include a plurality of motors, each able to be operated by a dedicated or a common inverter. In addition, the inverter can also be implemented to be capable of back feeding, so that when operating the drive motor as a generator, energy can be fed back into the intermediate circuit 3. In addition to drive devices for the traction of the vehicle, other consumers can also be connected to the intermediate circuit 3, for example, lifting devices for receiving a load or handling devices for displacing an object, such as a robot arm. An exchange of energy between the energy stores 1, 2 and the consumers 4 is also possible via the intermediate circuit 3. The intermediate circuit voltage $U_{ZK}$ is, e.g., in the range of low voltages, for example, between 120V and 600V.

Because the double-layer capacitor 2 is connected directly to the intermediate circuit 3, the intermediate circuit voltage $U_{ZK}$ is substantially always present in the double-layer capacitor 2. For protecting the double-layer capacitor 2, it is possible to provide a switch, for example, for interrupting the connection between the double-layer capacitor 2 and the intermediate circuit 3, for example, because the intermediate circuit voltage $U_{ZK}$ is too high or too low, or in order to protect the double-layer capacitor from too high a charging current $I_2$.

The battery store 1 is, for example, operated at a low voltage level. The storage voltage $U_S$ is, for example, a low voltage, e.g., 12V, 24V, 48V, or 96V. In order to increase safety, it is possible to galvanically isolate the two voltage levels $U_{ZK}$ and $U_S$ from each other. This can be implemented by a galvanically isolated DC converter 5. It is possible that the DC converter 5 is bidirectional. To this end, the DC converter includes a first converter device 6 for converting the intermediate circuit voltage $U_{ZK}$ into the storage voltage $U_S$, and a second converter device 7 for converting the storage voltage $U_S$ into the intermediate circuit voltage $U_{ZK}$. The two converter directions can be activated and deactivated individually. The activating and deactivating, for example, depends on the value of the intermediate circuit voltage $U_{ZK}$ and/or the value of the storage voltage $U_S$, as described in more detail below.

The vehicle, for example, has a controller for controlling the travel motion of the vehicle. The controller is, for example, electrically connected to the battery store 1 and can be supplied with energy by the same. The battery store is therefore adapted for supplying both the travel drive 4 and the controller with energy. The controller is, for example, communicatively connected to the DC converter 5 and the converter controller 11 thereof in order to selectively control the activating and deactivating of the two converter directions 6, 7. It is possible that the converter controller 11 autonomously controls the activating and deactivating of the two converter directions 6, 7.

The vehicle can, for example, be supplied with energy from an external source. To this end, the vehicle includes a power supply unit 8 including a current regulator 10 and a regulated current source 9 in the illustrated example embodiment. The power supply unit 8 is can also be referred to as a charging device or infeed. The current regulator 10 regulates the output current $I_0$ of the charging device 8 and thereby controls the output DC voltage $U_0$. The charging device 8 is connected to the intermediate circuit 3 without any voltage converter. The output DC voltage $U_0$ corresponds substantially to the intermediate circuit voltage $U_{ZK}$ in the illustrated example embodiment. For protecting the consumers or the charging device, it is possible that a controllable switch is disposed between the charging device 8 and the intermediate circuit 3 for disconnecting the charging device 8 from the intermediate circuit 3. When the switch is open, the two voltages are then different. The disconnecting, for example, takes place when the intermediate circuit voltage $U_{ZK}$ exceeds a definable maximum intermediate circuit voltage value $U_{ZK,max}$. The disconnecting is, for example, initiated by the charging device 8, to which the momentary measured value of the intermediate circuit voltage $U_{ZK}$ can be fed. In the illustrated example embodiment, the vehicle is inductively supplied with energy.

In the illustrated example embodiment, the output current $I_0$, also referred to as the infeed current, is divided into the three charging currents $I_1$, $I_2$, and $I_3$. The currents $I_1$, $I_2$, and $I_3$ are thereby defined so that positive values lead to charging the energy stores 1, 2 and to transferring power to the travel drive 4. When the components 1, 2, 4 feed energy into the intermediate circuit, the values of the currents are correspondingly negative.

For protecting the individual components, it is possible to capture the individual currents by current measuring devices and, in case of overloading, to disconnect the components from the intermediate circuit. In addition, temperature sensors are, for example, mounted on the energy stores 1, 2, in order to also disconnect the same from the intermediate circuit 3 in case of thermal overload. Finally, voltage measuring devices can be affixed to the individual components in order to protect the same from overvoltages or excessively low supply voltages. Overcurrent, overvoltage, undervoltage, and overtemperature protection can be implemented in this manner.

According to example embodiments of the present invention, the double-layer capacitor 2 mainly provides the drive energy for the travel drive 4 as the primary energy store. Energy, once transferred into the double-layer capacitor 2 by the charging current $I_2$, is intended to be available exclusively for the travel drive 4 when the double-layer capacitor discharges, that is, in case of negative currents $I_2$. Transferring energy from the double-layer capacitor 2 to the battery store 1, that is, a positive charging current $I_1$ and negative charging current $I_2$, should be prevented.

According to example embodiments of the present invention, such a transfer charging procedure is prevented in that the first converter direction 6 is deactivated when the double-layer capacitor 2 is discharged, that is, in case of negative charging currents $I_2$. Conversely, the first converter direction 6 is, for example, only activated when the double-layer capacitor is charging, that is, in case of positive charging currents $I_2$. In order to readily determine whether the charging current $I_2$ is positive or negative, it is utilized that the voltage of the double-layer capacitor substantially corresponds to the intermediate circuit voltage $U_{ZK}$. When the intermediate circuit voltage $U_{ZK}$ rises, for example, because an external power supply is present, or because the travel drive 4 is feeding energy back into the intermediate circuit 3, the voltage in the double-layer capacitor 2 also rises, bringing about a positive charging current $I_2$. Instead of directly measuring the current $I_2$, the course of the intermediate circuit voltage $U_{ZK}$ is used as a criterion for activating or deactivating the converter directions 6, 7. The value of the intermediate circuit voltage $U_{ZK}$ is typically necessary anyway for controlling the travel drive and therefore an additional current measuring device for the charging current $I_2$ can be eliminated.

Activating or deactivating the converter directions 6, 7 is, for example, determined by the time gradient $dU_{ZK}/dt$ of the intermediate circuit voltage $U_{ZK}$. For a positive or vanishing gradient ($dU_{ZK}/dt \geq 0$), the first converter direction 6 is activated, in which for a negative gradient ($dU_{ZK}/dt < 0$), the first converter direction 6 is deactivated.

The intermediate circuit voltage $U_{ZK}$, for example, only takes on values greater than a minimum value $U_{ZK,min}$ and less than a maximum value $U_{ZK,max}$, that is, $U_{ZK,min} < U_{ZK} < U_{ZK,max}$. Example values are $U_{ZK,min}=120V$ and $U_{ZK,max}=600V$. If the intermediate circuit voltage $U_{ZK}$ should drop below the minimum value $U_{ZK,min}$, the double-layer capacitor 2 can be disconnected from the intermediate circuit voltage 3, for example, in order to prevent complete discharging. If, however, the intermediate circuit voltage $U_{ZK}$ should rise above the maximum value $U_{ZK,max}$ and both energy stores are already fully charged, an overload can be prevented by a brake chopper in the intermediate circuit 3, for example.

For particular internal logistics applications, it can be provided that the voltage in the intermediate circuit 3 and thus in the double-layer capacitor 2 does not fall below a definable intermediate circuit voltage limit value $U_{ZK,G}$, or limit value for short, between the minimum value and the maximum value, that is, $U_{ZK,min} < U_{ZK,G} < U_{ZK,max}$. An example value is $U_{ZK,G}=200V$. This is achieved in that when the intermediate circuit voltage $U_{ZK}$ drops below the limit value $U_{ZK,G}$, the second converter direction 7 is activated for charging the double-layer capacitor 2. This is only possible, however, as long as the store voltage $U_S$ of the battery store 1 is above a minimum storage voltage $U_{S,min}$. The second converter direction 7 is, for example, deactivated when the intermediate circuit voltage $U_{ZK}$ is greater than the limit value $U_{ZK,G}$ and/or when the storage voltage $U_S$ is less than the minimum storage voltage $U_{S,min}$.

Charging the battery store is possible only for $dU_{ZK}/dt \geq 0$. It is further possible to activate the first converter direction 6, that is, to make charging possible at all, only when the intermediate circuit voltage $U_{ZK}$ is greater than the limit value $U_{ZK},G$, and when the storage voltage $U_S$ is less than a maximum storage voltage $U_{S,max}$. Conversely, it is possible to deactivate the first converter direction 6 when the storage voltage $U_S$ reaches a maximum storage voltage $U_{S,max}$ and/or when the intermediate circuit voltage $U_{ZK}$ is less than the limit value $U_{ZK,G}$.

The decision whether and when the converter directions 6, 7 are activated or deactivated can be made, for example, by the converter controller 11 in the illustrated example embodiment, in that the momentary value and the time curve of the intermediate circuit voltage $U_{ZK}$ is fed to the converter controller 11. Alternatively or in addition, it is possible that the converter controller 11 includes a voltage regulator, in which a value for the intermediate circuit voltage $U_{ZK,soll}$ is specified to the voltage regulator as a specified value. The specified value is, for example, equal to the limit value $U_{ZK,G}$ indicated above. The DC converter 5 therefore attempts to regulate the intermediate circuit voltage $U_{ZK}$ to the level of the limit value $U_{ZK,G}$. The regulating always takes place under the specification that for $dU_{ZK}/dt<0$, the first converter direction 6 is deactivated and remains deactivated.

In the example embodiment illustrated in FIG. 1, the charging device 8 includes a current regulator 10 and a regulated current source 9. The regulating of the output current $I_0$, for example, takes place in that when the maximum value $U_{ZK,max}$ indicated above is reached, the infeeding is interrupted. The momentary value of the intermediate circuit voltage $U_{ZK}$ is therefore transmitted to the current regulator 10. It is alternatively possible that the charging device 8 includes a regulated voltage source and a voltage regulator, in which the output voltage $U_0$ is regulated to a specified value $U_{0,soll}$ for the output voltage. The specified value is, for example, equal to the maximum value $U_{ZK,max}$ indicated above. Lesser values greater than the limit value $U_{ZK,G}$ are also possible, however. In any case, it is ensured that for the case that the charging device is supplied externally with energy, the charging device 8 charges the double-layer capacitor 2 and/or maintains the charge thereof. The battery store also charges the double-layer capacitor 2 when necessary, or maintains the charge thereof.

LIST OF REFERENCE CHARACTERS

1 Battery store
2 Double-layer capacitor
3 Intermediate circuit
4 Travel drive
5 DC converter
6 First converter direction
7 Second converter direction
8 Infeed
9 Regulated current source
10 Current regulator
11 Converter controller
$I_0$ Output current
$I_1$ Charging current of the first energy store
$I_2$ Charging current of the second energy store
$I_3$ Load current of the travel drive
$U_{ZK}$ Intermediate circuit voltage
$U_S$ Storage voltage
$U_0$ Infeed voltage

The invention claimed is:

1. A device adapted for travel motion and/or traction of the vehicle; a first energy storage device; a second energy storage device; and a bidirectional DC converter; wherein the drive device, the DC converter, and the second energy storage device are connected to each other via a common intermediate circuit that includes an intermediate circuit voltage; wherein the first energy storage device includes a storage voltage and is connected to the intermediate circuit via the DC converter; wherein the drive device is adapted to be supplied with drive energy by the first energy storage device and/or by the second energy storage device via the intermediate circuit; and wherein the DC converter is adapted to convert the intermediate circuit voltage into the storage voltage in a first converter direction to charge the first energy storage device and is adapted to convert the storage voltage into the intermediate circuit voltage in a second converter direction to discharge the first energy storage device, the first converter direction being activated during charging of the second energy storage device, the first converter direction being deactivated during discharging of the second energy storage device;

further comprising a power supply unit connected to the intermediate circuit adapted to supply energy to the intermediate circuit; wherein the power supply unit includes a regulated voltage source and a first voltage regulator, an output DC voltage being regulatable to a specified value for the output DC voltage; wherein the specified value is less than or equal to a maximum intermediate circuit voltage value.

2. The electric vehicle according to claim 1, wherein the electric vehicle is arranged as an automated guided transport vehicle (AGV) for an internal logistics application.

3. The electric vehicle according to claim 1, wherein the first energy storage device includes a rechargeable battery storage device, the second energy storage device includes a double capacitor and/or is more rapidly chargeable and dischargeable than the first energy storage device, and the DC converter is galvanically isolated.

4. The electric vehicle according to claim 1, wherein energy is feedable to the power supply unit in a non-contacting manner or by contact.

5. The electric vehicle according to claim 1, wherein the power supply unit includes a regulated current source and a current regulator, an output current being regulatable to a specified value.

6. The electric vehicle according to claim 5, wherein the intermediate circuit voltage is feedable to the power supply unit as an input parameter, and the power supply unit is adapted to be deactivated when the intermediate circuit voltage is greater than a maximum intermediate circuit voltage value.

7. The electric vehicle according to claim 1, the DC converter includes a second voltage regulator, a specified value for the intermediate circuit voltage being specifiable to the second voltage regulator.

8. The electric vehicle according to claim 7, wherein the specified value is equal to an intermediate circuit voltage limit value.

9. The electric vehicle according to claim 1, further comprising a controller adapted to control a travel motion of the vehicle, the controller being connected to the first energy storage device and being adapted to be supplied with energy by the first energy storage device.

10. The electric vehicle according to claim 1, wherein the second energy storage device is directly connected to the intermediate circuit, a voltage measuring device is adapted to measure a time gradient, continuously and/or at discrete time intervals, the first converter direction being activated when the gradient is positive or zero, the first converter direction being deactivated when the gradient is negative.

11. The electric vehicle according to claim 1, wherein the DC converter is adapted to activate the second converter direction to support the intermediate circuit voltage when the intermediate circuit voltage is less than an intermediate circuit voltage limit value and when the storage voltage is greater than a minimum storage voltage.

12. The electric vehicle according to claim 1, wherein the DC converter is adapted to deactivate the second converter direction when the intermediate circuit voltage is greater than the intermediate circuit voltage limit value and/or when the storage voltage is less than a minimum storage voltage.

13. The electric vehicle according to claim 1, wherein the DC converter is adapted to activate the first converter direction to charge the first energy storage device when the intermediate circuit voltage is greater than an intermediate circuit voltage limit value and when the storage voltage is less than a maximum storage voltage.

14. The electric vehicle according to claim 1, wherein the DC converter is adapted to deactivate the first converter direction when the storage voltage is greater than a maximum storage voltage and/or when the intermediate circuit voltage is less than an intermediate circuit voltage limit value.

15. The electric vehicle according to claim 1, wherein the second energy storage device adapted to receive more current than current that is providable by the power supply unit.

16. The electric vehicle according to claim 1, wherein the first energy storage device is separably disposed on the electric vehicle and is adapted to be changed out.

17. The electric vehicle according to claim 1, wherein an overvoltage protection and/or undervoltage protection and/ or overcurrent protection is provided at the first energy storage device by a current measurement and/or voltage measurement.

18. The electric vehicle according to claim 1, wherein an overtemperature protection is provided at the first energy storage device by a temperature measurement.

19. The electric vehicle according to claim 1, wherein an overvoltage protection and/or overcurrent protection is provided at the second energy storage device by a current measurement and/or voltage measurement.

20. The electric vehicle according to claim 1, wherein an overtemperature protection is provided at the second energy storage device by a temperature measurement.

21. A method for operating the electric vehicle recited in claim 1, comprising: supplying the drive device with drive energy by the first energy storage device and/or by the second energy storage device via the intermediate circuit; converting the intermediate circuit voltage into the storage voltage in a first converter direction by the DC converter to charge the first energy storage device; converting the storage voltage into the intermediate circuit voltage in a second converter direction by the DC converter to discharge the first energy storage device; activating the first converter direction during charging of the second energy storage device; and deactivating the first converter direction during discharging of the second energy storage device.

* * * * *